United States Patent [19]

Lipka

[11] Patent Number: 5,509,592
[45] Date of Patent: Apr. 23, 1996

[54] OUTBOARD MOTOR CARRIER FOR VEHICLES

[76] Inventor: Shawn E. Lipka, 122 W. High St., Ballston Spa, N.Y. 12020

[21] Appl. No.: 240,567

[22] Filed: May 11, 1994

[51] Int. Cl.$^6$ .................................. B60R 9/048
[52] U.S. Cl. .......................... 224/521; 224/535
[58] Field of Search ............ 224/42.45 R, 42.43 R, 224/42.03 B, 521, 531, 533, 535

[56] References Cited

U.S. PATENT DOCUMENTS

| | | | |
|---|---|---|---|
| 3,039,634 | 6/1962 | Hobson et al. | 224/42.03 R X |
| 4,241,858 | 12/1980 | Lawroski | 224/42.03 R X |
| 4,381,069 | 4/1983 | Kreck | 224/42.45 R X |
| 4,437,599 | 3/1984 | Jordening | 224/42.45 R X |
| 5,244,133 | 9/1993 | Abbott et al. | 224/42.45 R X |
| 5,385,280 | 1/1995 | Littlepage et al. | 224/42.45 R |

Primary Examiner—Renee S. Luebke

[57] ABSTRACT

Disclosed is a new outboard motor carrier for vehicles for supporting a conventional small marine outboard motor for transport on a rack coupled to a conventional vehicular trailer hitch sleeve. The outboard motor carrier for vehicles comprises an L-shaped support structure having an elongated vertical member with a horizontal member projecting normal the bottom end thereof. The horizontal member is slidably removably engaged with the trailer hitch sleeve. A rectangular wooden plank, simulating a boat transom whereto the motor may be clamped, is fixedly connected crosswise the vertical member at the top end thereof. A lock is provided for securing the motor to the carrier. Upper and lower safety chains are also provided to, respectively, prevent loss of the motor in the event of motor mount failure and prevent loss of the carrier in the event of carrier hitch securement bolt failure. A padlock secures the lower chain to prevent unauthorized removal of the carrier from the hitch.

3 Claims, 3 Drawing Sheets

U.S. Patent    Apr. 23, 1996    Sheet 1 of 3    5,509,592
FIG. 1
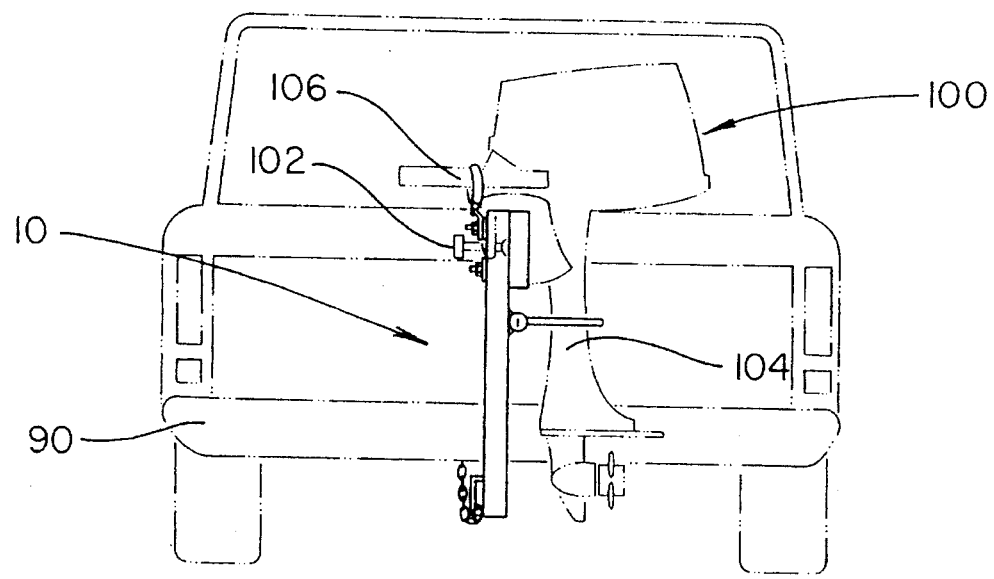
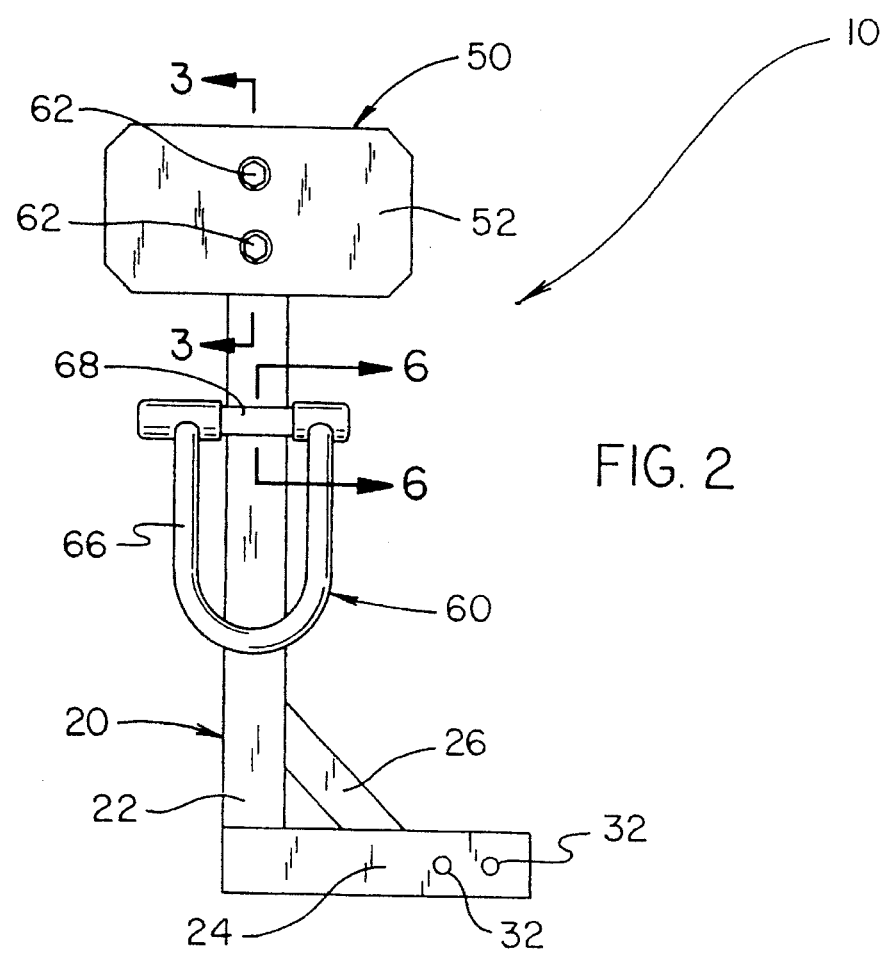
FIG. 2

OUTBOARD MOTOR CARRIER FOR VEHICLES

BACKGROUND OF THE INVENTION

1. Field of the Invention

The present invention relates to vehicle-mounted carrier racks and more particularly pertains to an outboard motor carrier for vehicles which may be adapted for supporting a conventional small marine outboard motor for transport on a rack coupled to a conventional vehicular trailer hitch sleeve.

2. Description of the Prior Art

The use of vehicle-mounted carrier racks is known in the prior art. More specifically, vehicle-mounted carrier racks heretofore devised and utilized for the purpose of supporting objects for vehicular transport are known to consist basically of familiar, expected and obvious structural configurations, notwithstanding the myriad of designs encompassed by the crowded prior art which have been developed for the fulfillment of countless objectives and requirements.

The present invention is directed to improving devices for supporting objects for vehicular transport in a manner which is safe, secure, economical and aesthetically pleasing.

U.S. Pat. No. 5,020,708 to Kalbach describes an outboard motor stand apparatus secured to the interior of a vehicle. The disclosure does not show a way to support an outboard motor on a carrier coupled to a trailer hitch sleeve of a vehicle.

The prior art also discloses an articulated support rack for vehicles as shown in U.S. Pat. No. 5,181,822 to Allsop et al., a rack mountable on a trailer hitch ball of U.S. Pat. No. 5,228,607 to Tolsdorf, a trailer hitch cycle rack in U.S. Pat. No. 4,380,344, and a vehicle trailer-hitch-mounted bicycle carrier shown in U.S. Pat. No. Des. 294,564 to Stoecker. While these devices fulfill their respective, particular objectives and requirements, the aforementioned patents do not disclose an outboard motor carrier for vehicles for supporting a conventional small marine outboard motor for transport on a rack coupled to a conventional vehicular trailer hitch sleeve.

In this respect, the outboard motor carrier for vehicles according to the present invention substantially departs from the conventional concepts and designs of the prior art, and in so doing provides an apparatus primarily developed for the purpose of supporting a conventional small marine outboard motor for transport on a rack coupled to a conventional vehicular trailer hitch sleeve.

Therefore, it can be appreciated that there exists a continuing need for a new outboard motor carrier for vehicles which can be used for supporting a conventional small marine outboard motor for transport on a rack coupled to a conventional vehicular trailer hitch sleeve. In this regard, the present invention substantially fulfills this need.

As illustrated by the background art, efforts are continuously being made in an attempt to develop devices for supporting objects for vehicular transport. No prior effort, however, provides the benefits attendant with the present invention. Additionally, the prior patents and commercial techniques do not suggest the present inventive combination of component elements arranged and configured as disclosed and claimed herein.

The present invention achieves its intended purposes, objects, and advantages through a new, useful and unobvious combination of method steps and component elements, with the use of a minimum number of functioning parts, at a reasonable cost to manufacture, and by employing only readily available materials.

SUMMARY OF THE INVENTION

In view of the foregoing disadvantages inherent in the known types of vehicle-mounted carrier racks now present in the prior art, the present invention provides a new vehicle-mounted carrier rack construction wherein the same can be utilized for supporting a conventional small marine outboard motor for transport on a rack coupled to a conventional vehicular trailer hitch sleeve. As such, the general purpose of the present invention, which will be described subsequently in greater detail, is to provide a new outboard motor carrier for vehicle. The apparatus has all the advantages of the prior art vehicle-mounted carrier racks and none of the disadvantages.

The invention is defined by the appended claims with the specific embodiment shown in the attached drawings. For the purpose of summarizing the invention, the invention may be incorporated into a new outboard motor carrier for vehicles for supporting a conventional small marine outboard motor for transport on a rack coupled to a conventional vehicular trailer hitch sleeve. The outboard motor carrier for vehicles comprises an L-shaped support structure constructed of metal tubing having an elongated vertical member with a horizontal member projecting normal to the bottom end thereof. The horizontal member is slidably removably engaged with the trailer hitch sleeve. The horizontal member has a plurality of lateral bolt holes therethrough aligned with a plurality of bolt holes through the trailer hitch sleeve. A bolt extends through each of the plurality of bolt holes whereby securing the carrier to the hitch. Each bolt is secured with a nut.

A bracket for attaching an upper safety chain is fixedly connected to the vertical member proximal the upper end thereof. The bracket has two ears, each of which have a hole therethrough wherethrough the ends of the upper chain may be connected. A metal loop for attaching a lower safety chain is integrally formed on the vertical member proximal the lower end thereof wherethrough the lower chain may extend.

A rectangular wooden plank, whereto the motor may be clamped using the motor's integral mount, is fixedly connected crosswise the vertical member at the top end thereof. The plank is connected in such a way to simulate a boat transom. The plank is aligned parallel the horizontal member whereby a motor clamped to the plank will face transverse the transporting vehicle with the motor drive shaft housing lying generally collateral the vertical member.

Locking means is provided whereby the motor may be secured to the carrier for preventing unauthorized removal of the motor from the carrier. The locking means comprises a U-shaped bar key-releasably connected to the vertical member. The U-shaped bar has an operative position wherein the bar is in surrounding relationship with the motor drive shaft housing with the open end of the bar being connected to the vertical member to secure the drive shaft housing to the vertical member. The U-shaped bar also has a release position wherein the open end of the bar is disconnected from the vertical member to release the motor drive shaft housing from the vertical member. A key releases the U-shaped bar from the vertical member to allow the motor to be removed from the carrier.

An upper safety chain redundantly releasably secures the motor to the carrier to prevent loss of the motor in the event of motor mount failure. The upper chain has a first end fixedly connected to the upper safety chain bracket. The upper chain is wrapped around an adjacent portion of the motor. The upper chain also has a second end removably connected to the upper safety chain bracket whereby removably securing the upper chain in position. The upper chain is coated with resilient plastic to prevent marring the finish of the motor.

A lower safety chain redundantly secures the carrier to the trailer hitch to prevent loss of the carrier in the event of carrier hitch securement bolt failure. The lower safety chain also prevents unauthorized removal of the carrier from the hitch. The lower chain is coupled to the safety chain bracket on the trailer hitch sleeve then extends through the lower safety chain loop of the vertical member. The lower chain has first and second ends secured together with a padlock.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In as much as the foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent methods and structures do not depart from the spirit and scope of the invention as set forth in the appended claims.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Therefore, it is an object of the present invention to provide a new outboard motor carrier for vehicles for supporting a conventional small marine outboard motor for transport on a rack coupled to a conventional vehicular trailer hitch sleeve.

It is another object of the present invention to provide a new outboard motor carrier for vehicles which may be easily and efficiently manufactured and marketed.

It is a further object of the present invention to provide a new outboard motor carrier for vehicles which is of a durable and reliable construction.

An even further object of the present invention is to provide a new outboard motor carrier for vehicles which is susceptible of a low cost of manufacture with regard to both materials and labor, and which accordingly is then susceptible of low prices of sale to the consuming public, thereby making such outboard motor carriers for vehicles economically available to the buying public.

Still yet another object of the present invention is to provide a new outboard motor carrier for vehicles which provides in the apparatuses and methods of the prior art some of the advantages thereof, while simultaneously overcoming some of the disadvantages normally associated therewith.

Still yet another object of the present invention is to provide a new outboard motor carrier for vehicles that improves safety by eliminating the possibility of gasoline or gasoline vapor entering the inside of the vehicle.

Yet another object of the present invention is to provide a new outboard motor carrier for vehicles that is usable with any truck or automobile having a compatible trailer hitch.

Even still another object of the present invention is to provide a new outboard motor carrier for vehicles that does not require the motor be carried inside the vehicle thereby freeing space in the truck bed or automobile trunk for additional supplies and equipment.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention. The foregoing has outlined some of the more pertinent objects of this invention. These objects should be construed to be merely illustrative of some of the more prominent features and applications of the present invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a rear elevational view of the new outboard motor carrier for vehicles showing its manner of use.

FIG. 2 is a right side elevational view of the invention of FIG. 1.

DESCRIPTION OF THE PREFERRED EMBODIMENT

Figure 3:
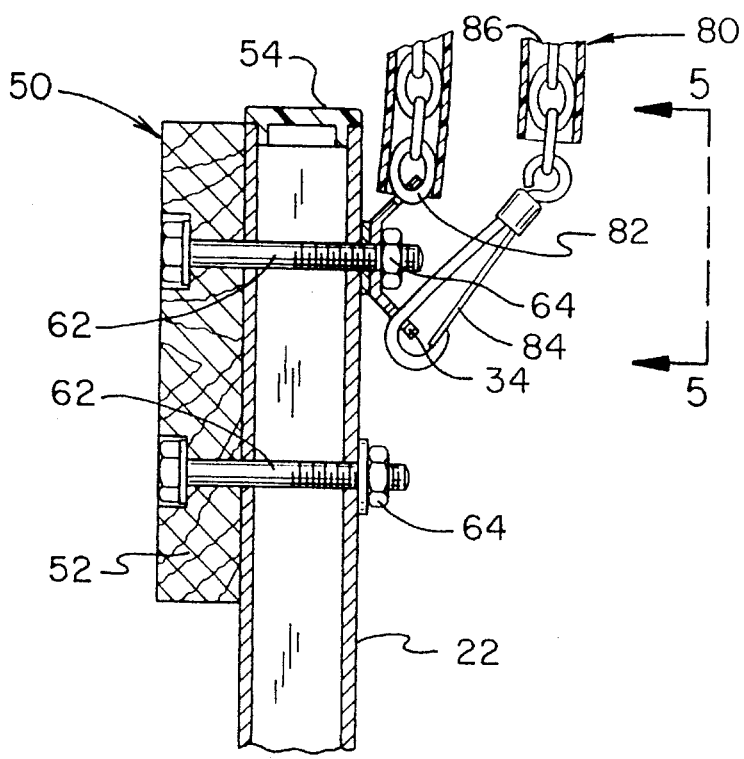
FIG. 3 is a sectional view of the invention of FIG. 2 taken along the line 3—3.

With reference now to the drawings, and in particular to FIG. 2 thereof, a new outboard motor carrier for vehicles embodying the principles and concepts of the present invention and generally designated by the reference numeral 10 will be described.

From an overview standpoint, the outboard motor carrier for vehicles is adapted for use for supporting a conventional small marine outboard motor for transport on a rack coupled to a conventional vehicular trailer hitch sleeve. See FIG. 1.

Figure 4:
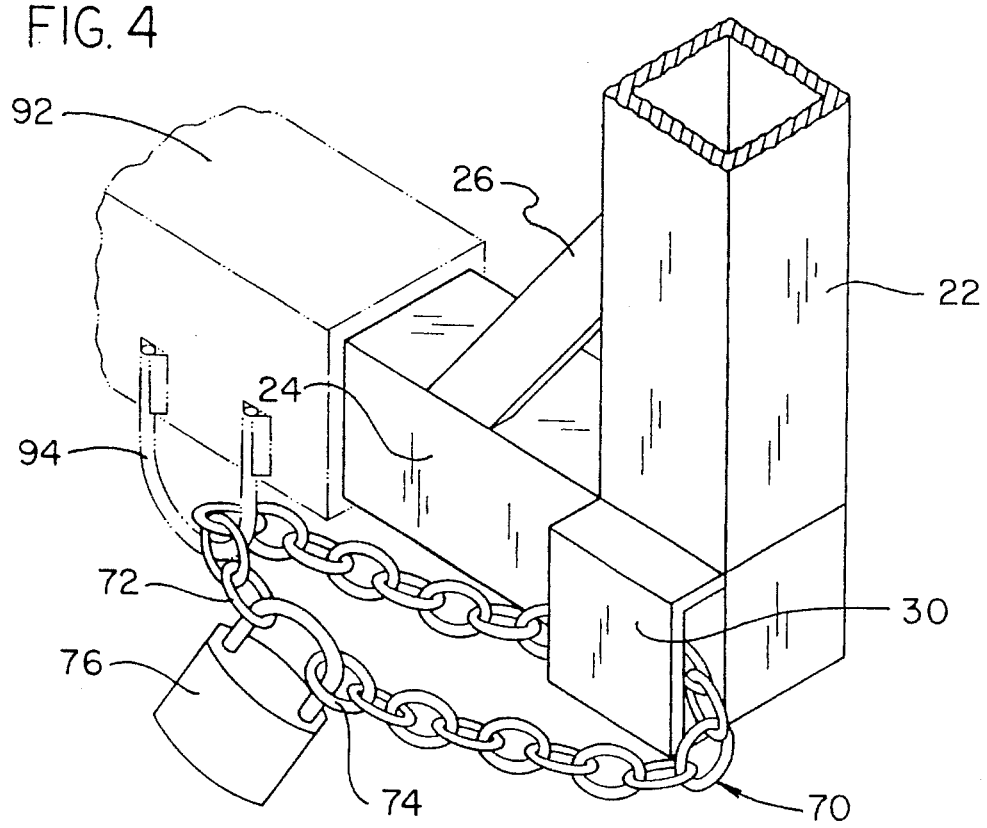
FIG. 4 is a partial top perspective view of the present invention illustrating the manner of connection to a trailer hitch sleeve.
Figure 5:
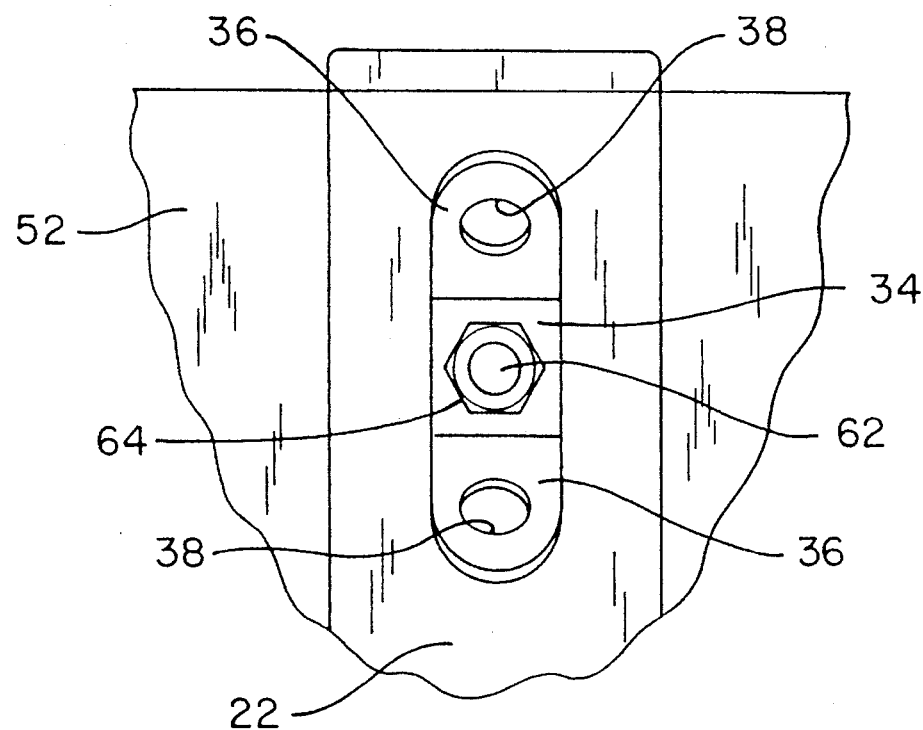
FIG. 5 is a right side elevational detail view showing the upper safety chain bracket.
Figure 6:
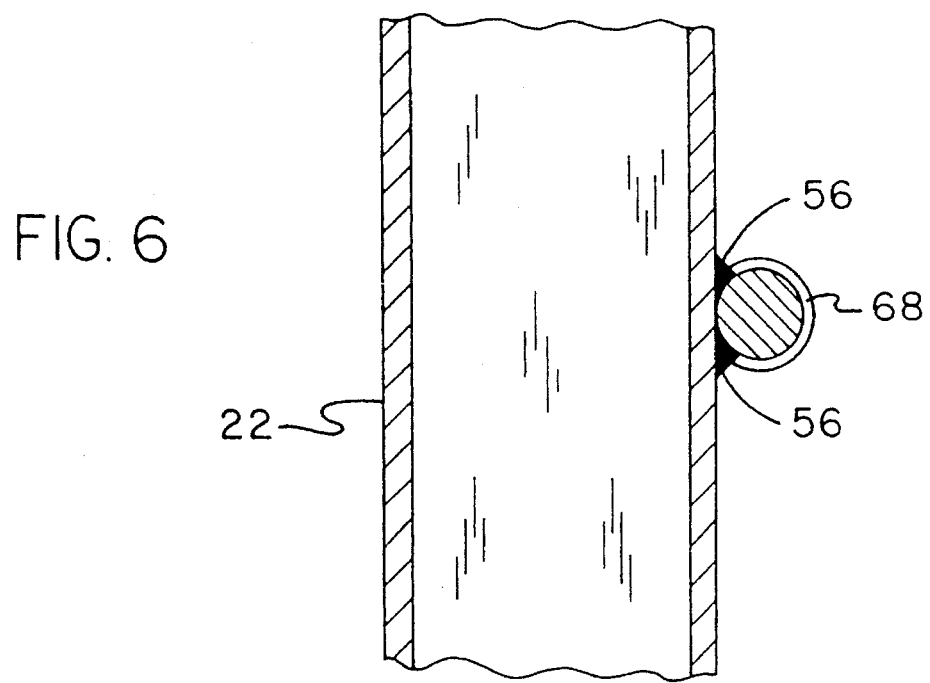
FIG. 6 is a sectional view of the invention of FIG. 2 showing the manner of attachment of the lock to the vertical member.

With reference now to FIGS. 1–6 and more specifically, it will be noted that an outboard motor carrier for vehicles 10 is shown. The outboard motor carrier for vehicles 10 comprises an L-shaped support structure 20 constructed of square metal tubing having an elongated vertical member 22 with a horizontal member 24 projecting normal the bottom end thereof. An integrally connected gusset 26 adds rigidity to the L-shaped structure 20 to improve the load carrying capability of the carrier 10. The horizontal member 24 is slidably removably engaged with the trailer hitch sleeve 92. The horizontal member 24 has a pair of lateral bolt holes 32 therethrough aligned with a pair of bolt holes through the trailer hitch sleeve 92. A bolt extends through each of the bolt holes 32 whereby securing the carrier 10 to the hitch 92. Each bolt is secured with a nut.

A bracket 34 for attaching an upper safety chain 80 is fixedly connected to the vertical member 22 proximal the upper end thereof. The bracket 34 has two ears 36, each of which have a hole 38 therethrough wherethrough the ends 82 and 84 of the upper chain 80 may be connected. A metal loop 30 for attaching a lower safety chain 70 is integrally formed on the vertical member 22 proximal the lower end thereof wherethrough the lower chain 70 may extend.

Outboard motor receiving means 50 comprises a rectangular wooden plank 52, whereto the motor 100 may be clamped using the motor's integral mount 102, fixedly connected crosswise the vertical member 22 at the top end thereof with a pair of bolts 62 and nuts 64. The plank 52 is connected in such a way to simulate a boat transom. The plank 52 is aligned parallel to the horizontal member 24 whereby a motor 100 clamped to the plank 52 will face transverse the transporting vehicle 90 with the motor drive shaft housing 104 lying generally collateral the vertical member 22.

Locking means is provided whereby the motor 100 may be secured to the carrier 10 for preventing unauthorized removal of the motor from the carrier. The locking means comprises a conventional bicycle lock 60 having a U-shaped bar 66 key-releasably engagable with a lock housing 68. The lock housing 68 is connected to the vertical member 22 intermediate the ends thereof with a plurality of welds 56. The U-shaped bar 66 has an operative position wherein the bar 66 is in surrounding relationship with the motor drive shaft housing 104 with the open end of the bar being connected to the lock housing 68 whereby securing the drive shaft housing 104 to the vertical member 22. The U-shaped bar 66 also has a release position wherein the open end of the bar 66 is disconnected from the lock housing 68 whereby releasing the motor drive shaft housing 104 from the vertical member 22. A key releases the U-shaped bar 66 from the vertical member 22 to allow the motor 100 to be removed from the carrier 10.

An upper safety chain 80 redundantly releasably secures the motor 100 to the carrier 10 to prevent loss of the motor in the event of motor mount failure. The upper chain 80 has a first end 82 fixedly connected to the upper safety chain bracket 34. The upper chain 80 is wrapped around an adjacent portion of the motor, normally the motor control arm 106. A second end of the upper chain has a clip 84 connected thereto whereby the second end is clipedly removably connected to the upper safety chain bracket 34 to secure the upper chain in position. The upper chain 80 is coated with resilient plastic 86 to prevent marring the finish of the motor 100.

A lower safety chain 70 redundantly secures the carrier 10 to the trailer hitch 92 to prevent loss of the carrier in the event of carrier hitch securement bolt failure. The lower safety chain 70 also prevents unauthorized removal of the carrier 10 from the hitch 92. The lower chain 70 is coupled to the safety chain bracket 94 on the trailer hitch sleeve then extends through the lower safety chain loop 30 of the vertical member 22. The lower chain 70 has first and second 72 and 74 ends secured together with a padlock 76.

The preferred embodiment of the new outboard motor carrier for vehicles lastly includes a plastic cap plug 54 frictionally engaged with the open top of the tubular vertical member 22 to prevent moisture and other foreign material from entering therein.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. In as much as the present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts may be resorted to without departing from the spirit and scope of the invention.

Now that the invention has been described,

What is claimed is:

1. A new outboard motor carrier for vehicles for supporting a conventional small marine outboard motor for transport on a rack coupled to a conventional vehicular trailer hitch sleeve, the outboard motor carrier for vehicles comprising:

an L-shaped support structure constructed of metal tubing having an elongated vertical member with a horizontal member projecting normal the bottom end thereof, the horizontal member being slidably removably engaged with the trailer hitch sleeve, the horizontal member having a plurality of lateral bolt holes therethrough aligned with a plurality of bolt holes through the trailer hitch sleeve;

a bolt extending through each of the plurality of bolt holes whereby securing the carrier to the hitch, each bolt being secured with a nut;

attachment means for an upper safety chain, the upper safety chain attachment means comprising a bracket fixedly connected to the vertical member proximal the upper end thereof, the bracket having at least two ears each of which having a hole therethrough whereto the ends of the upper chain may be connected;

attachment means for a lower safety chain, the lower safety chain attachment means comprising a metal loop integrally formed on the vertical member proximal the lower end thereof wherethrough the lower chain may extend;

motor receiving means whereto the motor may be clamped using the motor's integral mount, the motor receiving means comprising a rectangular wooden plank fixedly connected crosswise the vertical member at the top end thereof such that a boat transom is simulated, the plank being aligned parallel the horizontal member whereby a motor clamped to the plank will face transverse the transporting vehicle with the motor drive shaft housing lying generally collateral the vertical member;

locking means whereby the motor may be secured to the carrier for preventing unauthorized removal of the motor from the carrier, the locking means comprising: a U-shaped bar key-releasably connected to the vertical member, the U-shaped bar having an operative position wherein the bar is in surrounding relationship with the motor drive shaft housing, the open end of the bar being connected to the vertical member whereby securing the drive shaft housing to the vertical member, the U-shaped bar also having a release position wherein the open end of the bar is disconnected from the vertical member whereby releasing the motor drive shaft housing from the vertical member; and a key for releasing the U-shaped bar from the vertical member;

an upper safety chain whereby the motor may be redundantly releasably secured to the carrier to prevent loss of the motor in the event of motor mount failure, the upper chain having a first end fixedly connected to the upper safety chain attachment means, the upper chain being wrapped around an adjacent portion of a motor mounted on the carrier, the upper chain also having a second end removably connected to the upper safety chain attachment means whereby removably securing the upper chain in position, the upper chain being coated with resilient plastic to prevent marring the finish of the motor; and a lower safety chain whereby the carrier may be redundantly secured to the trailer hitch for preventing loss of the carrier in the event of carrier hitch securement bolt failure and also for preventing unauthorized removal of the carrier from the hitch, the lower chain being coupled to the trailer hitch sleeve, the lower safety chain extending through the lower safety chain attachment means, the lower chain having first and second ends secured together with a padlock.

2. A new outboard motor carrier for vehicles for supporting a conventional small marine outboard motor for transport on a rack coupled to a conventional vehicular trailer hitch sleeve, the outboard motor carrier for vehicles comprising:

an L-shaped support structure having an elongated vertical member with a horizontal member projecting normal the bottom end thereof, the horizontal member being slidably removably engaged with the trailer hitch sleeve, wherein the L-shaped support structure is constructed of metal tubing;

motor receiving means whereto the motor may be clamped using the motor's integral mount;

locking means whereby the motor may be secured to the carrier for preventing unauthorized removal of the motor from the carrier;

carrier securement means whereby the horizontal member is secured in engagement with the trailer hitch sleeve, the carrier securement means comprising a plurality of lateral bolt holes through the horizontal member aligned with a plurality of bolt holes through the trailer hitch sleeve, and a bolt extending through each of the plurality of bolt holes whereby securing the carrier to the hitch, each bolt being secured with a nut;

attachment means for an upper safety chain comprising a bracket fixedly connected to the vertical member proximal the upper end thereof, the bracket having at least two ears each of which having a hole therethrough whereto the upper chain may be connected;

including attachment means for a lower safety chain comprising a metal loop integrally formed on the vertical member proximal the lower end thereof wherethrough the lower chain may extend;

wherein the motor receiving means comprises a rectangular wooden plank fixedly connected crosswise the vertical member at the top end thereof such that a boat transom is simulated, the plank being aligned parallel the horizontal member whereby a motor clamped to the plank will face transverse the transporting vehicle with the motor drive shaft housing lying generally collateral the vertical member; and wherein the locking means comprises a U-shaped bar key-releasably connected to the vertical member, the U-shaped bar having an operative position wherein the bar is in surrounding relationship with the motor drive shaft housing, the open end of the bar being connected to the vertical member whereby securing the drive shaft housing to the vertical member, the U-shaped bar also having a release position wherein the open end of the bar is disconnected from the vertical member whereby releasing the motor drive shaft housing from the vertical member, and a key for releasing the U-shaped bar from the vertical member.

3. The outboard motor carrier for vehicles of claim 2 and further including an upper safety chain whereby the motor may be redundantly releasably secured to the carrier to prevent loss of the motor in the event of motor mount failure, the upper chain having a first end fixedly connected to the upper safety chain attachment means, the upper chain being wrapped around an adjacent portion of a motor mounted on the carrier, the upper chain also having a second end removably connected to the upper safety chain attachment means whereby removably securing the upper chain in position, the upper chain being coated with resilient plastic to prevent marring the finish of the motor.

\* \* \* \* \*